United States Patent
Li et al.

(10) Patent No.: US 11,411,956 B2
(45) Date of Patent: Aug. 9, 2022

(54) DATA PROCESSING METHOD AND TERMINAL

(71) Applicant: Huawei Technologies Co., Ltd., Shenzhen (CN)

(72) Inventors: Guoqing Li, Shenzhen (CN); Jingqing Mei, Shenzhen (CN); Xinmiao Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 595 days.

(21) Appl. No.: 16/464,089

(22) PCT Filed: Nov. 24, 2016

(86) PCT No.: PCT/CN2016/107028
§ 371 (c)(1),
(2) Date: May 24, 2019

(87) PCT Pub. No.: WO2018/094631
PCT Pub. Date: May 31, 2018

(65) Prior Publication Data
US 2019/0297084 A1 Sep. 26, 2019

(51) Int. Cl.
*H04L 29/06* (2006.01)
*H04L 9/40* (2022.01)
(Continued)

(52) U.S. Cl.
CPC ............ *H04L 63/101* (2013.01); *G06F 9/445* (2013.01); *H04W 4/80* (2018.02); *H04W 12/08* (2013.01); *H04W 12/69* (2021.01)

(58) Field of Classification Search
CPC ....... H04L 63/101; G06F 9/445; G06F 21/57; H04W 4/80; H04W 12/08; H04W 12/69
See application file for complete search history.

(56) References Cited

U.S. PATENT DOCUMENTS

| 7,028,019 B2 | 4/2006 | McMillan et al. |
| 9,917,841 B1 * | 3/2018 | Koller .................. H04W 88/02 |

(Continued)

FOREIGN PATENT DOCUMENTS

| CN | 1670698 A | 9/2005 |
| CN | 101266554 A | 9/2008 |

(Continued)

OTHER PUBLICATIONS

Yang el al.,"Trust-E:A Trusted Embedded Operating System Based on the Arm Trustzone" 978-1-4799-7646-1/14; IEEE; International Conference on Ubiquitous Intelligence and Computing/nternational Conference on Autonomic and Trusted Computing/International, Date of Conference: Dec. 9-12, 2014,p. 495-502 (Year: 2014).*

(Continued)

*Primary Examiner* — Harunur Rashid
(74) *Attorney, Agent, or Firm* — Conley Rose, P.C.

(57) ABSTRACT

A data processing method includes determining whether a first conflicting application related to a first conflicting peripheral is in a whitelist, independently taking over the first conflicting peripheral in response to the first conflicting application being in the whitelist, where the first conflicting application runs in a rich execution environment (REE), and sending data generated by the first conflicting peripheral to the first conflicting application in response to a trusted user interface (TUI) being displayed.

18 Claims, 8 Drawing Sheets

100

Determine whether a first conflicting application related to a first conflicting peripheral is in a whitelist — 110

When it is determined that the first conflicting application is in the whitelist, independently take over the first conflicting peripheral, where the first conflicting application is an application that is running in a rich execution environment REE — 120

When a TUI is displayed, send data generated by the first conflicting peripheral to the first conflicting application — 130

(51) Int. Cl.
*H04W 4/80* (2018.01)
*H04W 12/08* (2021.01)
*G06F 9/445* (2018.01)
*H04W 12/69* (2021.01)

(56) References Cited

U.S. PATENT DOCUMENTS

| | | | |
|---|---|---|---|
| 2005/0021996 A1* | 1/2005 | Howard | G06F 21/445 726/26 |
| 2006/0200530 A1 | 9/2006 | Tokuda et al. | |
| 2006/0206855 A1 | 9/2006 | Nair et al. | |
| 2011/0231510 A1 | 9/2011 | Korsunsky et al. | |
| 2013/0097708 A1 | 4/2013 | Jayanthi et al. | |
| 2014/0075496 A1 | 3/2014 | Prakash et al. | |
| 2016/0182499 A1 | 6/2016 | Sharaga et al. | |
| 2016/0182539 A1* | 6/2016 | Edwards | G06F 21/82 726/23 |
| 2016/0232335 A1* | 8/2016 | Violleau | G06F 21/629 |
| 2016/0274955 A1 | 9/2016 | Hu | |
| 2018/0124064 A1* | 5/2018 | Schrecker | H04L 63/20 |

FOREIGN PATENT DOCUMENTS

| | | |
|---|---|---|
| CN | 101558377 A | 10/2009 |
| CN | 102394870 A | 3/2012 |
| CN | 102402466 A | 4/2012 |
| CN | 102479108 A | 5/2012 |
| CN | 103116716 A | 5/2013 |
| CN | 104025103 A | 9/2014 |
| CN | 104516704 A | 4/2015 |
| CN | 105511961 A | 4/2016 |
| CN | 104541279 B | 7/2017 |

OTHER PUBLICATIONS

Foreign Communication From a Counterpart Application, European Application No. 16922386.4, Extended European Search Report dated Dec. 13, 2019, 8 pages.
Machine Translation and Abstract of Chinese Publication No. CN1670698, Sep. 21, 2005, 25 pages.
Machine Translation and Abstract of Chinese Publication No. CN102402466, Apr. 4, 2012, 24 pages.
Foreign Communication From a Counterpart Application, Chinese Application No. 201680080687.1, Chinese Office Action dated Nov. 1, 2019, 4 pages.
Foreign Communication From a Counterpart Application, Chinese Application No. 201680080687.1, Chinese Search Report dated Oct. 24, 2019, 2 pages.
Machine Translation and Abstract of Chinese Publication No. CN101266554, Sep. 17, 2008, 10 pages.
Machine Translation and Abstract of Chinese Publication No. CN101558377, Oct. 14, 2009, 16 pages.
Machine Translation and Abstract of Chinese Publication No. CN102394870, Mar. 28, 2012, 8 pages.
Machine Translation and Abstract of Chinese Publication No. CN102479108, May 30, 2012, 28 pages.
Machine Translation and Abstract of Chinese Publication No. CN103116716, May 22, 2013, 11 pages.
Machine Translation and Abstract of Chinese Publication No. CN105511961, Apr. 20, 2016, 19 pages.
"TEE Trusted User Interface (Low Level) API," GPD_SPE_055, GlobalPlatform Device Technology, Version 0.0.0.15, Draft for v1.0, Feb. 2016, 77 pages.
Foreign Communication From a Counterpart Application, PCT Application No. PCT/CN2016/107028, English Translation of International Search Report dated Sep. 4, 2017, 2 pages.
Foreign Communication From a Counterpart Application, PCT Application No. PCT/CN2016/107028, English Translation of Written Opinion dated Sep. 4, 2017, 4 pages.

* cited by examiner

100

---

Determine whether a first conflicting application related to a first conflicting peripheral is in a whitelist — 110

When it is determined that the first conflicting application is in the whitelist, independently take over the first conflicting peripheral, where the first conflicting application is an application that is running in a rich execution environment REE — 120

When a TUI is displayed, send data generated by the first conflicting peripheral to the first conflicting application — 130

┌─────────────────────────────────────────────────────┐
│ Determine a first conflicting peripheral that conflicts with a TUI and │
│ determine a first conflicting application related to the first conflicting │
│ peripheral │
└─────────────────────────────────────────────────────┘
                                                        210

┌─────────────────────────────────────────────────────┐
│ Based on an application permission verification complete message │
│ sent by a trusted execution environment TEE management module, │
│ determine to allow the first conflicting application to receive data │
│ generated by the first conflicting peripheral, where the first │
│ conflicting application is an application that is running in a rich │
│ execution environment REE, and the application permission │
│ verification complete message indicates that the first conflicting │
│ application is in a whitelist of an REE management module │
└─────────────────────────────────────────────────────┘
                                                        220

┌─────────────────────────────────────────────────────┐
│ When the TUI is displayed, determine to allow the first conflicting │
│ application to receive the data generated by the first conflicting │
│ peripheral and sent by the TEE management module │
└─────────────────────────────────────────────────────┘
                                                        230

FIG. 2

DATA PROCESSING METHOD AND TERMINAL

CROSS-REFERENCE TO RELATED APPLICATIONS

This application is a U.S. National Stage of International Patent Application No. PCT/CN2016/107028 filed on Nov. 24, 2016, which is hereby incorporated by reference in its entirety.

TECHNICAL FIELD

Embodiments of the present invention relate to the field of information security, and more specifically, to a data processing method and a terminal.

BACKGROUND

A side-channel attack is also referred to as a side-channel attack, and is a method for carrying out an attack by collecting side channel information, such as time consumption, power consumption, or an electromagnetic radiation signal during running of an electronic device. If a malicious application is implanted in a terminal, the malicious application in the terminal may obtain peripheral data by accessing a peripheral of the terminal, and further perform intelligent processing on the peripheral data, so as to obtain information that is entered by a user, such as an account and a password. This is a common side-channel attack manner on the terminal. The peripheral (English: Peripheral) refers to an external device or an external interface in a computer or a mobile terminal except a host central controller. For example, in the mobile terminal, interface devices such as Bluetooth, Wireless Fidelity (English: Wireless Fidelity, Wi-Fi for short), near field communication (English: Near Field Communication, NFC for short), a universal serial bus (English: Universal Serial Bus, USB for short), a microphone, a 3.5-mm audio jack, a gyroscope, a magnetometer, and a gravity sensor are all considered as peripherals.

Therefore, the mobile terminal should strictly manage permission of an application to access the peripheral, so as to reduce a possibility of a side-channel attack. In one prior art, a terminal powered by an Android system provides an interface for managing various peripherals and permission for a mobile terminal in settings, so that a user can grant specific peripheral access permission to a specific application. An iOS system implements a similar function. The user can set, through a permission management interface, a restriction condition for accessing a peripheral by an application. However, such application permission management of a mobile terminal operating system requires the user to restrict peripheral access permission when the user installs an application, or to adjust peripheral access permission of an application on a settings page after the application is installed. This is not convenient for a common mobile terminal user, and this restriction is usually static and cannot adapt to a complex application running environment in the mobile terminal.

In another prior art, to avoid the side-channel attack, when displaying a trusted user interface (English: Trusted User Interface, TUI for short), the terminal prohibits an external entity from accessing as many peripherals as possible, which include but are not limited to an accelerometer, a gyroscope, a magnetometer, a microphone, Bluetooth, NFC, and the like. The TUI is a user interaction interface implemented based on a trusted execution environment (English: Trusted Execution Environment, TEE for short). The TUI is controlled only by a trusted application that invokes the TUI. An isolation mechanism of the TEE ensures that the TUI is not interfered by an application in a rich execution environment (English: Rich Execution Environment, REE for short) or another trusted application in the TEE other than an invoker, and may provide a secure information input interface and a secure information display interface for the user. This strict peripheral control policy ensures that when the user enters information through the TUI, a malicious application is prevented from carrying out a side-channel attack by using sensor data, but the peripheral control policy also affects some basic functions of the terminal.

The TEE is a running environment coexisting with the REE in the mobile terminal, and can provide a secure running environment for a trusted application. The TEE has a CPU core that is isolated from the REE, and the CPU core of the TEE may be a core that is physically isolated from the REE or that is virtually isolated from the REE. The TEE has storage space that is invisible to the REE and that is implemented by using a secure storage technology. The TEE can ensure that assets (such as a key, data, and software) in the storage space of the TEE are protected from software attacks, and resist a security threat of a specific type. Only a trusted application verified by a security process can be securely loaded to the TEE for running. The REE is a more open and less controlled running environment compared with the TEE, and is easily affected by a malicious program, and it is risky to store user's sensitive data in the REE.

Therefore, a method for controlling an application to access a terminal peripheral is urgently needed, so that not only information security of the terminal can be ensured, but also a limitation and impact on a terminal function can be minimized, where the limitation and the impact are caused by an access restriction on a terminal peripheral when a TUI is displayed.

SUMMARY

Embodiments of the present invention provide a data processing method and a terminal, to ensure information security of the terminal and minimize an access restriction on a terminal peripheral when a TUI is displayed.

According to a first aspect, a data processing method is provided and includes: determining whether a first conflicting application related to a first conflicting peripheral is in a whitelist: when it is determined that the first conflicting application is in the whitelist, independently taking over the first conflicting peripheral, where the first conflicting application is an application that is running in a rich execution environment REE: and when the TUI is displayed, sending data generated by the first conflicting peripheral to the first conflicting application.

It should be understood that when it is determined that the trusted user interface TUI is to be displayed, it is determined whether the first conflicting application related to the first conflicting peripheral is in the whitelist. For example, when an application programming interface API TEE_TUIInitSession( ) or TEE_TUIDisplayScreen( ) for displaying the TUI is invoked, it is determined that the TUI is to be displayed, and the method in the first aspect is performed before the API is invoked.

Specifically, the determining that the trusted user interface TUI is to be displayed includes the following: When invoking the TUI, a trusted application (English: Trusted Application, TA for short) in a TEE sends a request message to a TEE management module, and the TEE management module notifies an REE management module that the TEE is to display the TUI. Specifically, before the TA invokes an application programming interface (English: Application Programming Interface, API for short), defined by a GP (English: Global Platform) TUI specification, for initializing a TUI session, the TA invokes an interface provided by the TEE management module to notify the REE management module that the TUI is to be displayed.

It should be understood that, a process of notifying the REE management module that the TEE is to display the TUI may further be as follows: A client application (English: Client Application, CA for short) sends a notification message to the REE management module to notify the REE management module that the TEE is to display the TUI.

The trusted application TA runs in the TEE of a terminal and is implemented by using software and hardware resources provided by the TEE, and the TA may serve another TA in the TEE or a CA in the REE. The CA runs in an REE environment of the terminal, and may invoke the TA through an interface provided by the TA.

It should be understood that the first conflicting application related to the first conflicting peripheral means that the first conflicting application can obtain data from the first conflicting peripheral, and generally refers to an application that is running and that accesses a conflicting peripheral, or an application that exchanges data with a conflicting peripheral. Therefore, the first conflicting peripheral may also be understood as the first conflicting peripheral related to the first conflicting application. Permission for a peripheral that each application requests to access may be queried by using an application manager of the terminal. Therefore, a related conflicting application may also be all applications that are running and that obtain access permission for a conflicting peripheral, and the first conflicting application may refer to one or more applications.

It should be understood that the conflicting peripheral refers to a peripheral that may disclose various types of status information of a terminal device or may trigger a side-channel attack, for example, Bluetooth data, a terminal device posture, and memory usage. The conflicting peripheral is determined by a TEE manufacturer or a terminal manufacturer. For example, all peripherals of the terminal device are defined as conflicting peripherals, which include but are not limited to an accelerometer, a gyroscope, a magnetometer, a microphone, Bluetooth, NFC, and the like.

It should be understood that the whitelist may be preset in advance in the TEE management module. The user may modify and set the whitelist according to an actual requirement, and add an application to the whitelist or delete an application from the whitelist. The whitelist includes at least an identifier of an application that is allowed to access a peripheral. When the TUI is displayed, only an application in the whitelist is allowed to receive data generated by a related conflicting peripheral. Further, the whitelist may further include at least one piece of the following information: an identifier of a peripheral that is allowed for access, a type of data that is allowed for transmission between a peripheral that is allowed for access and an application related to the peripheral, and the like. When the TUI is displayed, only the application in the whitelist is allowed to access a peripheral specified in the whitelist, or only the application in the whitelist is allowed to access data of a specific type of a peripheral specified in the whitelist.

It should be further understood that, that the TEE management module independently takes over the first conflicting peripheral means that the TEE management module independently takes over the first conflicting peripheral, and the REE management cannot take over the first conflicting peripheral.

For example, the first conflicting peripheral may be a Bluetooth interface of the terminal, a first conflicting application related to the Bluetooth interface is a telephone application, and the whitelist includes: 1. an ID of the telephone application, an ID of the Bluetooth interface, and an audio type; 2. an ID of the telephone application, an ID of a USB peripheral, and an audio type; and 3. an ID of the telephone application, an ID of an audio jack peripheral, and an audio type. In this way, when determining to take over the first conflicting peripheral, the TEE management module discovers that the telephone application is in the whitelist, and a condition 1 is met. Therefore, audio data generated by a Bluetooth headset may be sent to the telephone application through the Bluetooth interface.

It should be further understood that independently taking over the first conflicting peripheral means that the TEE management module exclusively occupies the first conflicting peripheral, loads a TEE driver of the peripheral, and forbids the REE management module to take over or control the first conflicting peripheral.

This embodiment of the present invention provides a method for processing peripheral data, so that not only information security of the terminal can be ensured, but also a limitation and impact on a terminal function can be minimized, where the limitation and the impact are caused by an access restriction on a terminal peripheral when a user interface TUI provided by the trusted execution environment TEE is used.

With reference to the first aspect, in a first possible implementation of the first aspect, the determining whether a first conflicting application related to a first conflicting peripheral is in a whitelist includes: receiving an application permission request message sent by an REE management module, where the application permission message carries an identifier of the first conflicting application and an identifier of the first conflicting peripheral; and determining, based on the identifier of the first conflicting application and the identifier of the first conflicting peripheral, whether the first conflicting application and the first conflicting peripheral are in the whitelist.

With reference to the first aspect and the implementation of the first aspect, in a second possible implementation of the first aspect, before the taking over the first conflicting peripheral, the method further includes: sending an application permission verification complete message to the REE management module, where the application permission verification complete message is used to instruct the REE management module to release control permission for the first conflicting peripheral.

With reference to the first aspect and the implementations of the first aspect, in a third possible implementation of the first aspect, after the taking over the first conflicting peripheral, the method further includes: establishing a data channel for communicating with the first conflicting application, where the data channel is used to transmit data of a target data type, and the target data type is a type, defined in the whitelist, of data that is transmitted between the first conflicting application and the first conflicting peripheral.

With reference to the first aspect and the implementations of the first aspect, in a fourth possible implementation of the first aspect, the sending data generated by the first conflicting peripheral to the REE management module includes: when it is determined that a data type of the data generated by the first conflicting peripheral is the target data type, sending the data generated by the first conflicting peripheral to the first conflicting application in the REE.

With reference to the first aspect and the implementations of the first aspect, in a fifth possible implementation of the first aspect, the method further includes: sending a notification message to the REE management module, where the notification message is used to notify the REE management module that display of the TUI terminates, and the REE management module takes over the first conflicting peripheral again.

According to a second aspect, a data processing method is provided, where the method is applied to a terminal that includes a trusted execution environment TEE, and includes: determining a first conflicting peripheral that conflicts with the TUI and determining a first conflicting application related to the first conflicting peripheral: based on a permission verification complete message sent by a trusted execution environment TEE management module, determining to allow the first conflicting application to receive data generated by the first conflicting peripheral, where the first conflicting application is an application that is running in a rich execution environment REE, and the application permission verification complete message indicates that the first conflicting application is in a whitelist of the TEE management module: and when the TUI is displayed, determining that the first conflicting application receives the data generated by the first conflicting peripheral and sent by the TEE management module.

It should be understood that the determining that the first conflicting application receives the data generated by the first conflicting peripheral may be understood as controlling the first conflicting application to receive the data generated by the first conflicting peripheral.

With reference to the second aspect, in a first possible implementation of the second aspect, the determining to allow the first conflicting application to receive data generated by the first conflicting peripheral includes: sending an application permission request message to the TEE management module, where the application permission request message carries an identifier of the first conflicting application and an identifier of the first conflicting peripheral, and the identifier of the first conflicting application and the identifier of the first conflicting peripheral are used for determining, by the TEE management module, whether the first conflicting application and the first conflicting peripheral are in the whitelist.

With reference to the second aspect, in a second possible implementation of the second aspect, the determining to allow the first conflicting application to receive data generated by the first conflicting peripheral includes: releasing control permission for the first conflicting peripheral according to the application permission verification complete message.

With reference to the second aspect, in a third possible implementation of the second aspect, the method further includes: establishing a data channel for communicating with the TEE management module, where the data channel is used to transmit data of a target data type, and the target data type is a type, defined in the whitelist, of data that is transmitted between the first conflicting application and the first conflicting peripheral.

With reference to the second aspect, in a fourth possible implementation of the second aspect, the determining that the first conflicting application receives the data generated by the first conflicting peripheral and sent by the TEE management module includes: determining that the first conflicting application receives, through the data channel, data of the target data type that is generated by the first peripheral conflicting peripheral.

With reference to the second aspect, in a fourth possible implementation of the second aspect, before the TUI is displayed, the method further includes: receiving a notification message sent by the TEE management module, where the notification message is used to notify the REE management module that display of the TUI terminates, and the REE management module takes over the first conflicting peripheral again.

According to a third aspect, an apparatus is provided, configured to perform the method in the first aspect or any possible implementation of the first aspect. Specifically, the apparatus includes units configured to perform the method in the first aspect or any possible implementation of the first aspect.

According to a fourth aspect, an apparatus is provided, configured to perform the method in the second aspect or any possible implementation of the second aspect. Specifically, the apparatus includes units configured to perform the method in the second aspect or any possible implementation of the second aspect.

According to a fifth aspect, a terminal is provided, where the terminal includes: a transceiver, a memory, configured to store an instruction, and a processor. connected to both the memory and the transceiver and configured to execute the instruction stored in the memory, so as to control the transceiver to receive a signal and/or send a signal, and when the processor executes the instruction stored in the memory, the processor performs the method in the first aspect or any possible implementation of the first aspect, and the method in the second aspect or any possible implementation of the second aspect.

According to a sixth aspect, an apparatus is provided, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and/or send a signal. In addition, when the processor executes the instruction stored in the memory, the processor performs the method in the first aspect or any possible implementation of the first aspect.

According to a seventh aspect, an apparatus is provided, where the apparatus includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and/or send a signal. In addition, when the processor executes the instruction stored in the memory, the processor performs the method in the second aspect or any possible implementation of the second aspect.

According to an eighth aspect, a computer-readable medium is provided and is configured to store a computer program, and the computer program includes an instruction used to perform the method in the first aspect or any possible implementation of the first aspect.

According to a ninth aspect, a computer-readable medium is provided and is configured to store a computer program, and the computer program includes an instruction used to perform the method in the second aspect or any possible implementation of the second aspect.

BRIEF DESCRIPTION OF DRAWINGS

FIG. 1 is a schematic flowchart of a method according to the present invention;

FIG. 2 is a schematic flowchart of a method according to another embodiment of the present invention;

DESCRIPTION OF EMBODIMENTS

Figure 3A:
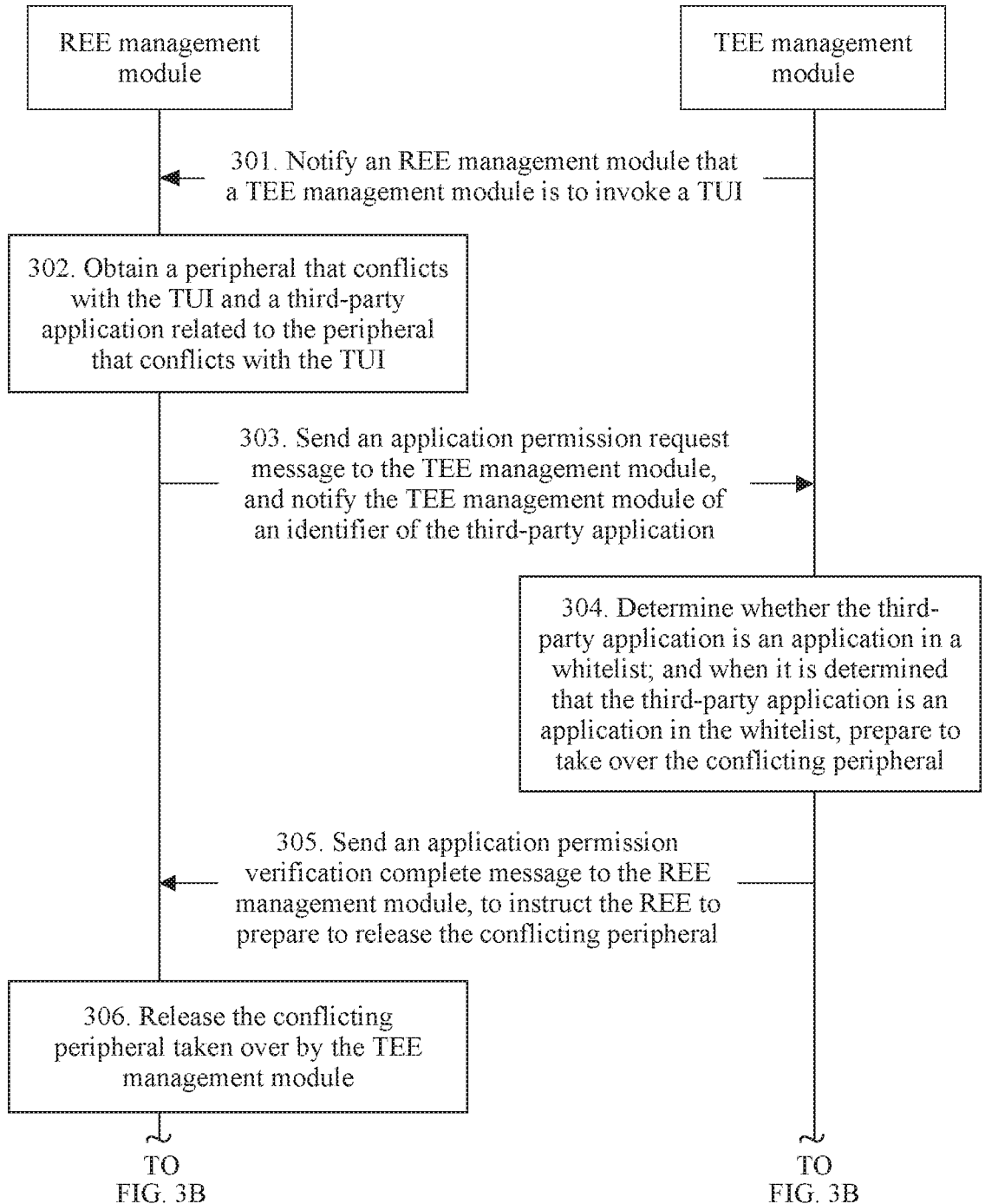
FIG. 3A and FIG. 3B is a schematic flowchart of a method according to the present invention.

The following clearly and completely describes the technical solutions in embodiments of the present invention with reference to the accompanying drawings in the embodiments of the present invention.

FIG. 1 is a schematic flowchart of a method according to the present invention. As shown in FIG. 1, the method may be performed by a trusted execution environment TEE management module in a terminal. The TEE management module may communicate with an REE management module or an application in an REE. The module includes a whitelist, and has a function of managing and controlling a peripheral in the terminal. The TEE management module may manage a TEE driver of the peripheral and obtain peripheral data by using the TEE driver. The method is applied to a terminal that includes a trusted execution environment TEE and includes the following steps:

Step 110: Determine whether a first conflicting application related to a first conflicting peripheral is in a whitelist.

Step 120: When it is determined that the first conflicting application is in the whitelist, independently take over the first conflicting peripheral, where the first conflicting application is an application that is running in a rich execution environment REE.

Step 130: When a trusted user interface TUI is displayed, send data generated by the first conflicting peripheral to the first conflicting application.

Correspondingly, a rich execution environment REE management module determines a first conflicting peripheral that conflicts with the TUI and determines a first conflicting application related to the first conflicting peripheral. The REE management module may be a function module of an REE OS, and has a function of managing an REE application and an REE peripheral. The REE management module can control an REE driver for loading, unloading, enabling, and disabling the peripheral, disable the REE application, further communicate with the TEE management module, and the like. This is not limited in the present invention. Specifically, before step 110, the rich execution environment REE management module determines the first conflicting peripheral that conflicts with the TUI and the first conflicting application related to the first conflicting peripheral. Based on an application that is running in a current REE environment, the REE management module determines to send an application permission request message to the TEE management module, so as to determine which applications are allowed to access a specific conflicting peripheral when the TUI is displayed. The application permission request message carries an identifier of the first conflicting application and an identifier of the first conflicting peripheral, and the identifier of the first conflicting application and the identifier of the first conflicting peripheral are used for determining, by the TEE management module, whether the first conflicting application and the first conflicting peripheral are in the whitelist.

It should be understood that the first conflicting peripheral may be one or more peripherals that conflict with TUI display. The first conflicting application may refer to one or more applications in the REE, and the permission verification message may carry an identifier of at least one first conflicting application and an identifier of a first conflicting peripheral related to the at least one first conflicting application.

It should be understood that the whitelist may be preset in advance in the TEE management module, and a user may modify and set an application in the whitelist and a related peripheral thereof according to an actual requirement. The whitelist includes at least an identifier of an application that is allowed for access. In this case, the application in the whitelist may receive data generated by a related conflicting peripheral, and the TEE management module may take over the first conflicting peripheral. Further, the whitelist may further include at least one piece of the following information: an identifier of a peripheral that is allowed for access, a type of data that is allowed for transmission between a peripheral that is allowed for access and an application related to the peripheral, and the like. When the TUI is displayed, only an application in the whitelist is allowed to receive the data generated by the conflicting peripheral. Further, the whitelist may further include at least one piece of the following information: an identifier of a peripheral that is allowed for access, a type of data that is allowed for transmission between a peripheral that is allowed for access and an application related to the peripheral, and the like. When the TUI is displayed, only the application in the whitelist is allowed to access a peripheral specified in the whitelist, or only the application in the whitelist is allowed to access data of a specific type of a peripheral specified in the whitelist.

TABLE 1

| Whitelist | Application identifier | Peripheral identifier | Data type |
|---|---|---|---|
| 1 | Call application ID | Bluetooth interface ID | Audio |
| 2 | Call application ID | USB interface ID | Audio |
| 3 | Call application ID | Audio jack interface ID | Audio |

Table 1 is an example of the whitelist. A call application that meets a condition of Table 1 may receive data of a target type that is generated by a related conflicting peripheral. For example, the call application may receive, through a Bluetooth interface, audio data generated by a Bluetooth headset. For another example, the call application may receive audio data and the like through an audio jack interface. It should be understood that Table 1 is merely an example. The whitelist may include only an application identifier list, or may include only an application identifier and a peripheral identifier, or may include only an application identifier and a data type, or may include the foregoing three types of information or more pieces of information. The present invention is not limited thereto.

It should be understood that the USB interface may also be used as an audio interface, for example, an iPhone lightning interface iPhone lightning interface.

This embodiment of the present invention provides a method for processing peripheral data, so that not only information security of the terminal can be ensured, but also a limitation and impact on a terminal function can be minimized. where the limitation and the impact are caused by an access restriction on a terminal peripheral when a user interface TUI provided by the trusted execution environment TEE is used.

Optionally, in an embodiment of the present invention, determining whether the first conflicting application related to the first conflicting peripheral is in the whitelist includes: receiving an application permission request message sent by an REE management module, where the application permission message carries an identifier of the first conflicting application and an identifier of the first conflicting peripheral; and determining, based on the identifier of the first conflicting application and the identifier of the first conflicting peripheral, whether the first conflicting application and the first conflicting peripheral are in the whitelist.

Further, based on an application permission verification complete message sent by the trusted execution environment TEE management module, the REE management module determines to allow the first conflicting application to receive the data generated by the first conflicting peripheral, where the first conflicting application is an application that is running in the rich execution environment REE, and the application permission verification complete message indicates that the first conflicting application is in the whitelist of the REE management module.

The application permission verification complete message is further used by the REE management module to determine to release control permission for the first conflicting peripheral, so as to ensure that the first conflicting peripheral is independently taken over by the TEE management module.

Optionally, in an embodiment of the present invention, after the TEE management module takes over the first conflicting peripheral, the method further includes: establishing a data channel for communicating with the first conflicting application, where the data channel is used to transmit data of a target data type, and the target data type is a type, defined in the whitelist, of data that is transmitted between the first conflicting application and the first conflicting peripheral.

Further, the data channel may be alternatively established between the REE management module and the TEE management module, where the data channel is used to transmit data of a target data type, and the target data type is a type, defined in the whitelist, of data that is transmitted between the first conflicting application and the first conflicting peripheral. After the data of the target type is sent to the REE management module by the TEE management module, the data of the target type is forwarded to the first conflicting application.

To be specific, only when the first conflicting peripheral, the first conflicting application related to the first conflicting peripheral, and the target data type of the data that is transmitted between the first conflicting peripheral and the first conflicting application are all in the whitelist, the first conflicting peripheral is taken over by the TEE management module, and the first conflicting application in the REE is allowed to receive the data of the target data type that is generated by the first conflicting peripheral.

Optionally, in an embodiment of the present invention, that the TEE management module sends the data generated by the first conflicting peripheral to the first conflicting application in the REE includes: when it is determined that a data type of the data generated by the first conflicting peripheral is the target data type, sending the data generated by the first conflicting peripheral to the first conflicting application in the REE.

Further, it is determined that the first conflicting application receives, through the data channel, data of the target data type that is generated by the first peripheral conflicting peripheral.

Optionally, in an embodiment of the present invention, the method further includes: The TEE management module sends a notification message to the REE management module, where the notification message is used to notify the REE management module that display of the TUI terminates, and the REE management module takes over the first conflicting peripheral again.

Further, the REE management module receives the notification message sent by the TEE management module, where the notification message is used to notify the REE management module that the display of the TUI terminates, and the REE management module takes over the first conflicting peripheral again.

Optionally, in an embodiment of the present invention, the first conflicting peripheral is a Bluetooth interface, the first conflicting application is a telephone application, and the target data type is audio data based on an Advanced Audio Distribution Profile (English: Advanced Audio Distribution Profile, A2DP for short).

This embodiment of the present invention provides a method for processing peripheral data, so that not only information security of the terminal can be ensured, but also an access restriction on a terminal peripheral in a trusted execution environment TEE can be minimized, thereby less limiting and affecting a terminal function.

FIG. 2 is a schematic flowchart of a method according to another embodiment of the present invention. The method may be performed by a rich execution environment REE management module in a terminal, and the method 200 includes the following steps:

Step 210: Determine a first conflicting peripheral that conflicts with the TUI and determine a first conflicting application related to the first conflicting peripheral.

Step 220: Based on an application permission verification complete message sent by a trusted execution environment TEE management module, determine to allow the first conflicting application to receive data generated by the first conflicting peripheral, where the first conflicting application is an application that is running in a rich execution environment REE, and the application permission verification complete message indicates that the first conflicting application is in a whitelist of the REE management module.

Step 230: When the TUI is displayed, determine that the first conflicting application receives the data generated by the first conflicting peripheral and sent by the TEE management module.

Optionally, in an embodiment of the present invention, the determining to allow the first conflicting application to receive data generated by the first conflicting peripheral includes: sending an application permission request message to the TEE management module, where the application permission request message carries an identifier of the first conflicting application and an identifier of the first conflicting peripheral, and the identifier of the first conflicting application and the identifier of the first conflicting peripheral are used for determining, by the TEE management module, whether the first conflicting application and the first conflicting peripheral are in the whitelist.

Optionally, in an embodiment of the present invention, the determining to allow the first conflicting application to receive data generated by the first conflicting peripheral includes: releasing control permission for the first conflicting peripheral according to the permission verification complete message.

Optionally, in an embodiment of the present invention, the method further includes: establishing a data channel for communicating with the TEE management module, where the data channel is used to transmit data of a target data type, and the target data type is a type, defined in the whitelist, of data that is transmitted between the first conflicting application and the first conflicting peripheral.

Optionally, in an embodiment of the present invention, the receiving the data generated by the first conflicting peripheral and sent by the TEE management module includes: receiving, through the data channel, data of the target data type that is generated by the first peripheral conflicting peripheral.

Optionally, in an embodiment of the present invention, the method further includes: receiving a notification message sent by the TEE management module, where the notification message is used to notify the REE management module that display of the TUI terminates, and the REE management module takes over the first conflicting peripheral again.

This embodiment of the present invention provides a method for processing peripheral data. so that not only information security of the terminal can be ensured, but also an access restriction on a terminal peripheral in a trusted execution environment TEE can be minimized, thereby less limiting and affecting a terminal function.

Figure 3B:
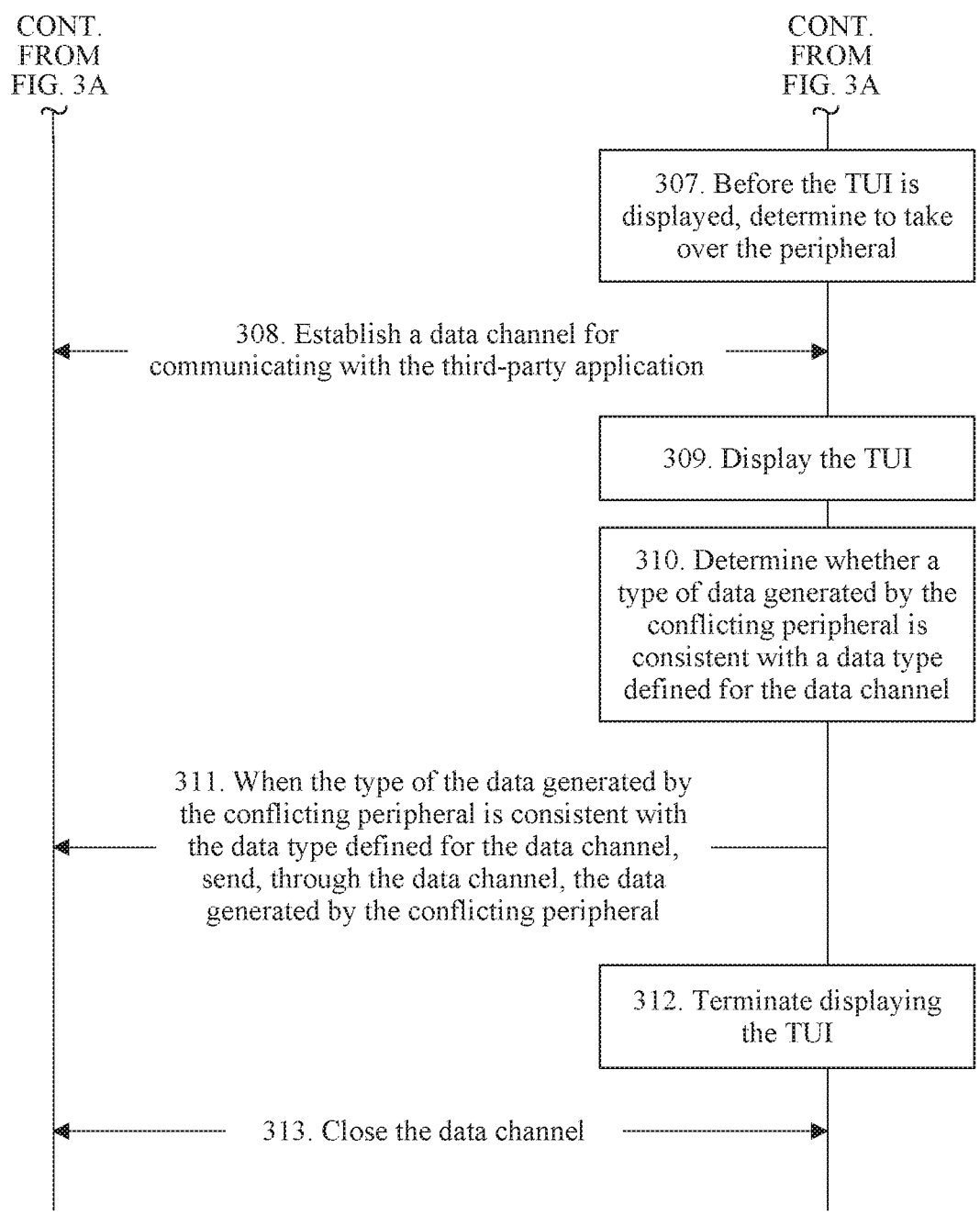

FIG. 3A and FIG. 3B is a schematic flowchart of a method according to the present invention, and the method is performed by a terminal.

As shown in FIG. 3A and FIG. 3B, the method includes the following steps.

Step 301: A TEE management module notifies an REE management module that a TUI is to be invoked.

To invoke the TUI, a trusted application (English: Trusted Application, TA for short) in a TEE sends a TUI invoking request to the TEE management module. In this case, the TEE management module notifies the REE management module that the TEE is to display the TUI. and obtaining peripheral data by a client application (English: Client Application, CA for short) in an REE may be affected. Specifically, before the TA invokes an application programming interface (English: Application Programming Interface, API for short), defined by a GP TUI specification, for initializing a TUI session, the TA first invokes an interface provided by the TEE management module to notify the REE management module that the TUI is to be displayed.

Another alternative to step 301 is that a client application (English: Client Application, CA for short) in an REE environment sends a notification message to an REE management module to notify the REE management module that a current TEE is to display a TUI, and then the CA requests, by invoking an interface provided by a TA. the TEE to display the TUI.

For example, when a CA application invokes a password input function, the TUI is displayed. In this case, the CA sends a notification message to the REE management module to notify the REE management module that the TUI is to be displayed.

The TA is an application that runs in a TEE of the terminal and that is implemented by using software and hardware resources provided by the TEE, and may serve another TA in the TEE or a CA in the REE. The CA is an application that runs in an REE environment of the terminal, and may invoke, by invoking an interface provided by a specific TA. a function provided by the TEE.

Step 302: The REE management module obtains a peripheral that conflicts with the TUI and a third-party application related to the peripheral that conflicts with the TUI.

The peripheral that conflicts with the TUI refers to a peripheral whose peripheral data may be obtained by a malicious program, which triggers a side-channel attack against the TUI, that is, a peripheral that should not be accessed when the TUI is displayed. Generally, a TUI conflicting peripheral list is pre-stored in the TEE management module. A peripheral in the list is not expected to be accessed by the CA when the TUI is displayed, because when data generated by the peripheral in the TUI conflicting peripheral list is obtained by a malicious application running in the REE environment, a side-channel attack against the TUI may be caused.

Specifically, the side-channel attack is also referred to as a side-channel attack, and is a method for carrying out an attack by collecting side channel information, such as time consumption, power consumption, or an electromagnetic radiation signal during running of an electronic device. On a mobile terminal platform, a hacker determines, by using obtained gyroscope data. a password entered by a user. A specific procedure is as follows: Induce the user to install a malicious application, where the application requires only gyroscope permission and does not require ROOT permission. When the user logs in to mobile Internet banking or uses a payment tool such as Alipay to make payment, in this case, a displayed interface is a TUI interface. The user needs to tap a screen to enter a PIN code or a login password. For example, the user taps a virtual keyboard on a display screen to complete input. In this case, the malicious application collects the gyroscope data, and further obtains "shake information" of a mobile terminal. The malicious application may locally send the collected data back to the hacker. By running a specific algorithm, the hacker may determine a location that the user taps on the display screen when a specific shake occurs. Based on the tapped location on the screen, the hacker determines a character entered by the user, so as to determine the entered PIN code. Further, accuracy of determining the PIN code may be improved by using a machine learning method, and finally, the PIN code set by the user is captured.

Therefore, in the TEE environment, peripheral data needs to be securely processed, so that not only information security of the terminal can be ensured, but also an access restriction on a terminal peripheral in the trusted execution environment TEE can be minimized.

Further, for the TEE management module, peripherals may be classified into three types: A first-type peripheral is a peripheral whose driver module is included in the TEE of the terminal. The TEE management module may fully control this type of peripherals and obtain data or output data by using the peripheral. The TEE management module can further forward data generated by this type of peripherals to an application in the REE, and this type of peripherals is referred to as a peripheral that can be taken over in the TEE. Generally, a driver module of the peripheral that can be taken over may be disposed in both the TEE management module and the REE management module. When the TUI is displayed, the REE management module releases control permission for this type of peripherals that can be taken over, and the TEE management module obtains the control permission for this type of peripherals that can be taken over, and can forward, to an application in the REE, the data generated by the peripheral that can be taken over. A second-type peripheral is a peripheral whose driver module is not included in the TEE management module but included in the REE management module, and peripherals include a controllable (Controllable) peripheral and a parsable (Parsable) peripheral. The controllable peripheral refers to a peripheral for which the TEE management module may receive and parse a peripheral event (Peripheral Event), and send a control instruction to the peripheral, so that an event flow (Event flow) of the peripheral is normally executed. The parsable (Parsable) peripheral is a peripheral for which the TEE management module cannot parse various peripheral events, but the TEE management module can capture and forward the peripheral events and send a control instruction to the peripheral. The TEE management module may lock this type of peripherals, for example, set this type of peripherals to an occupied state. In this case, the TEE management module cannot forward data generated by a locked peripheral to the application in the REE. In addition, the peripheral that is set to the occupied state is also disabled in the REE management module, and the application in the REE cannot access the peripheral. A third-type peripheral is a peripheral whose driver module does not exist in the TEE management module and that cannot be locked. The TEE management module is unable to control such a peripheral, and the peripheral is also referred to as a peripheral that is fully managed by the REE management module.

The embodiment shown in FIG. 3A and FIG. 3B is applied to the first-type peripheral that conflicts with the TUI, that is, the peripheral that conflicts with the TUI and whose driver module is included in the TEE. For ease of description, the peripheral that conflicts with the TUI in this embodiment refers to a peripheral whose driver module is in the TEE management module.

Further, after obtaining a conflicting peripheral that conflicts with the TUI, the REE further determines an application related to the conflicting peripheral. For example, if the conflicting peripheral is a Bluetooth interface, the application related to the peripheral may be a telephone application, a music play application, or the like.

Specifically, the REE management module needs to obtain a list of currently running REE applications, including a currently running foreground application and all background applications that use peripherals, such as a music player application, a telephone application, a Weibo application, and a browser application. These applications may be applications provided by a terminal manufacturer or applications installed by the user. They are collectively referred to as third-party applications or conflicting applications herein. In this embodiment, the third-party application is equivalent to the conflicting application. It should be understood that the third-party application herein is the first conflicting application described in the embodiment in FIG. 1 or FIG. 2.

Step 303: The REE management module sends an application permission request message to the TEE management module, where the application permission request message carries an identifier of the third-party application.

Step 304: The TEE management module determines, based on the identifier of the third-party application, whether a conflicting peripheral related to the third-party application can be accessed when the TUI is displayed. Specifically, it is determined whether the third-party application is an application in a whitelist in the TEE management module. When determining that the third application is an application in the whitelist, the TEE management module prepares to take over a related conflicting peripheral that the third-party application requests to access.

It should be understood that the whitelist may be preset in advance in the TEE management module, and the user may further modify and set the whitelist according to an actual requirement.

It should be further understood that a blacklist may further be added to the TEE management module. The blacklist may include an identifier of an application that is not allowed for access. Further, the blacklist may further include an identifier and a data type of a peripheral that is not allowed for access. A function of the blacklist is similar to that of the whitelist. The TEE management module may determine, based on the blacklist, whether a peripheral can be taken over, whether data generated by the peripheral can be sent to a related application, and the like.

It should be further understood that if the TEE management module determines, based on the identifier of the third-party application, that the third-party application is not in the whitelist, that is, a conflicting peripheral related to the third-party application cannot be accessed, the TEE management module is not to take over the conflicting peripheral, that is, when the TUI is displayed, the conflicting peripheral cannot be accessed by the TEE.

In other words, if the third-party application is not in the whitelist, when the TUI is displayed, the conflicting peripheral related to the third-party application is set to access forbidden, and can neither be accessed by the TEE management module nor by the REE management module.

Step 305: The TEE management module sends an application permission verification complete message to the REE management module, that is, instructs the REE management module to release control permission for the conflicting peripheral, so that the TEE management module takes over the conflicting peripheral.

It should be understood that the application permission verification complete message carries the identifier of the third-party application and/or the data type of the conflicting peripheral. Based on the permission verification complete message, the REE management module may determine to allow a third-party application specified in the application permission verification complete message to receive a data message of a specific data type. Further, the application permission verification message may further instruct the REE to release control over the conflicting peripheral and prohibit modification to configuration of the conflicting peripheral. The application permission verification complete message is equivalent to a peripheral control policy sent to the REE management module.

Step 306: The REE management module releases the control permission for the conflicting peripheral.

Specifically, a procedure for releasing the control permission for the conflicting peripheral by the REE management module may be as follows: Invoke a close function driven by a peripheral in the REE to disable the peripheral, and set a mark indicating that the peripheral has exited REE management. When the TEE detects the mark, a driver of the peripheral in the TEE may be invoked to enable the peripheral and obtain control permission for the peripheral.

After steps 301 to 306 are performed, the TEE management module prepares a list of running third-party applications that have permission to obtain peripheral data. The terminal displays the TUI. Optionally, the TEE or the REE disables an unpermitted application (that is, an application different from those in the list of third-party applications), and further starts to forward the peripheral data to a permitted whitelist application. A procedure and specific steps are shown in steps 307 to 313.

In step 307. before the TUI is displayed, the TEE management module determines to take over the conflicting peripheral.

Specifically, when a TUI system service in the TEE receives a TUI display request sent by the CA or sent by the TA. the TEE management module checks whether the mark "exit REE management" set in step 306 is set for the conflicting peripheral. If the mark is set, the TEE invokes a peripheral driver of the conflicting peripheral to enable the peripheral.

Step 308: Establish a data channel for communicating with the third-party application.

Specifically, at least one socket socket channel may be established between the TEE management module and the REE management module, and the at least one socket channel can be used for connecting a conflicting peripheral and a third-party application related to the conflicting peripheral.

In addition, a type of peripheral data that allows to be sent through each socket channel is recorded in the TEE management module, for example, A2DP-based audio data that allows to be sent to a call application through a socket channel between the TEE management module and the call application in the REE.

It should be understood that there is at least one socket channel between the conflicting peripheral and the related third-party application, that is, the TEE management module may determine a quantity of socket channels based on an actual quantity of third-party applications, where each third-party application is corresponding to one socket channel. In other words, the TEE management module may establish one socket for each application according to a quantity of currently running applications associated with a conflicting peripheral and in the whitelist. For example, the TEE management module manages a GPS peripheral, and can separately establish one socket channel for a "Codoon sports application" and a "Joyrun application". The TEE may alternatively establish one socket channel only for the conflicting peripheral. For example, the TEE establishes one audio data socket channel only for a Bluetooth peripheral. Data generated by the Bluetooth peripheral may be sent to the call application in the REE through the channel, and only the call application in the REE is allowed to access the socket channel.

Further, when the socket channel is established between the TEE management module and the conflicting application, the socket is identified by using an identifier of the conflicting application. The identifier of the conflicting application may be specified by a certificate authority, or may be allocated by a TEE manufacturer, and a developer of the conflicting application needs to submit an application to the TEE manufacturer. When creating the socket channel, the TEE management module obtains the identifier of the conflicting application from the whitelist.

Further, in the TEE management module, the TEE management module can send, through a socket channel corresponding to the identifier of the third-party application in the whitelist, the data generated by the conflicting peripheral. It should be understood that a mapping relationship exists between each conflicting peripheral and a related third-party application. In the REE management module, the third application in the whitelist can also enable, according to the conflicting peripheral, a corresponding socket channel to receive data.

In the REE, in addition to establishing of a socket connection to the conflicting peripheral in the TEE management module, all applications that are not in the whitelist need to be disabled, and the peripheral in the REE needs to be disabled.

Through the foregoing process, the TEE management module completes takeover of the conflicting peripheral.

Step 309: Display the TUI.

Step 310: When the conflicting peripheral generates data. determine whether a type of the data generated by the conflicting peripheral is consistent with a data type defined for the data channel.

It should be understood that, when the conflicting peripheral generates the data, the TEE management module checks the type of the data generated by the conflicting peripheral, sends type-matched data to the third-party application in the REE through the data channel, and discards mismatched data. Specifically, for example, if the Bluetooth interface generates A2DP audio data (that is, a data type specified in the whitelist), the A2DP audio data is sent to a telephone application in the REE management module through the data channel. If a Bluetooth peripheral of a terminal device can generate or forward heart rate (heart rate) or pedometer data, the heart rate or pedometer data is buffered by a TA in the TEE or directly discarded.

Step 311: When the TEE management module determines that the type of the data generated by the conflicting peripheral is consistent with the data type defined for the data channel, send, through the data channel, the data generated by the conflicting peripheral.

Step 312: Terminate displaying the TUI. When a user operation ends, a TUI session is closed. In this case, the TEE management module releases control permission for the conflicting peripheral. Then, the TEE management module disables the driver of the conflicting peripheral in the TEE, and sets, for the conflicting peripheral, a mark indicating that the peripheral exits TEE management, so that the REE management module takes over the conflicting peripheral again.

In addition, after detecting that a related conflicting peripheral has exited TEE management, the REE management module enables the peripheral again or restores control over the conflicting peripheral, and forwards data to an application that is related to the conflicting peripheral and that has registered peripheral permission.

Step 313: Close the data channel.

That is, after buffered data is sent to a related application in the REE through the data channel, the data channel is closed.

This embodiment of the present invention provides a method for processing peripheral data, so that not only information security of the terminal can be ensured, but also an access restriction on a terminal peripheral in a trusted execution environment TEE can be minimized, thereby less limiting and affecting a terminal function.

Figure 4A:
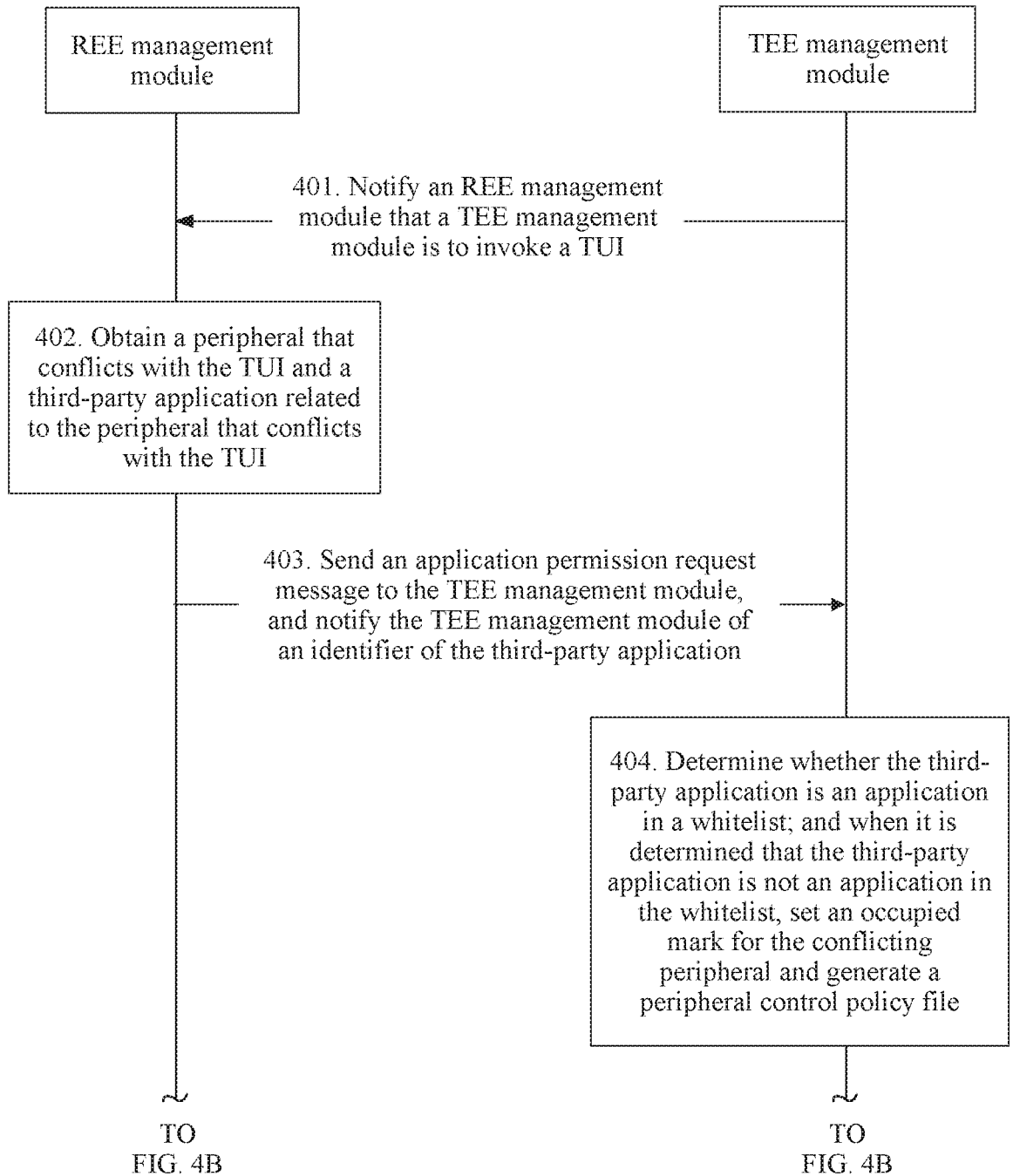
FIG. 4A and FIG. 4B is a schematic flowchart of a method according to the present invention.
Figure 4B:
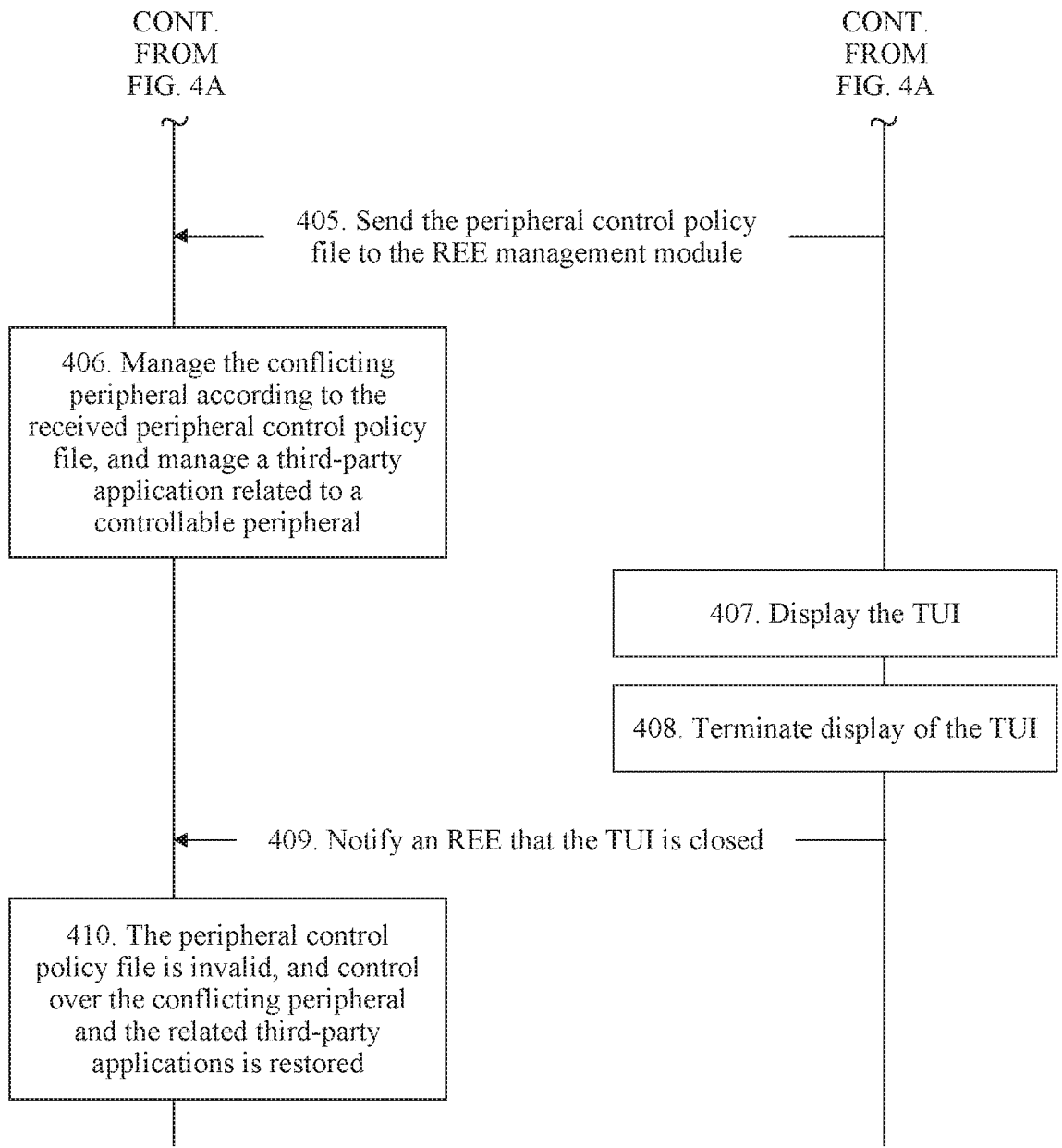

FIG. 4A and FIG. 4B is a schematic flowchart of a method according to the present invention, and the method is performed by a terminal.

As shown in FIG. 4A and FIG. 4B, the method includes the following steps.

Step 401: A TEE management module notifies an REE management module that a TUI is to be invoked.

Step 402: The REE management module obtains a peripheral that conflicts with the TUI and a third-party application related to the peripheral that conflicts with the TUI.

The peripheral that conflicts with the TUI refers to a peripheral whose peripheral data may be obtained by a malicious program, which triggers a side-channel attack against the TUI, that is, a peripheral that should not be accessed when the TUI is displayed. Generally, a TUI conflicting peripheral list is pre-stored in the TEE management module. A peripheral in the list is not expected to be accessed when the TUI is displayed, because when data generated by the peripheral in the TUI conflicting peripheral list is obtained by a malicious application running in the REE environment, a side-channel attack against the TUI may be caused.

Further, for the TEE management module, peripherals may be classified into three types: A first-type peripheral is a peripheral whose driver module is included in the TEE of the terminal. The TEE management module may fully control this type of peripherals and obtain data or output data by using the peripheral. The TEE management module can further forward data generated by this type of peripherals to an application in the REE, and this type of peripherals is referred to as a peripheral that can be taken over in the TEE. Generally, a driver module of the peripheral that can be taken over may be disposed in both the TEE management module and the REE management module. When the TUI is displayed, the REE management module releases control permission for this type of peripherals that can be taken over, and the TEE management module obtains the control permission for this type of peripherals that can be taken over, and can forward, to an application in the REE, the data generated by the peripheral that can be taken over. A second-type peripheral is a peripheral whose driver module is not included in the TEE management module but included in the REE management module, and peripherals include a controllable (Controllable) peripheral and a parsable (Parsable) peripheral. The controllable peripheral refers to a peripheral for which the TEE management module may receive and parse a peripheral event (Peripheral Event), and send a control instruction to the peripheral, so that an event flow (Event flow) of the peripheral is normally executed. The parsable (Parsable) peripheral is a peripheral for which the TEE management module cannot parse various peripheral events, but can capture and forward the peripheral events and send a control instruction to the peripheral. The TEE management module may lock this type of peripherals, for example, set this type of peripherals to an occupied state. In this case, the TEE management module cannot forward data generated by a locked peripheral to the application in the REE. In addition, the peripheral that is set to the occupied state is also disabled in the REE management module, and the application in the REE cannot access the peripheral. A third-type peripheral is a peripheral whose driver module does not exist in the TEE management module and that cannot be locked. The TEE management module is unable to control such a peripheral, and the peripheral is also referred to as a peripheral that is fully managed by the REE management module.

A description of the embodiment shown in FIG. 4A and FIG. 4B is applied to the second-type peripheral that conflicts with the TUI, that is, a peripheral that conflicts with the TUI but whose driver module is not included in the TEE management module. The second-type peripheral may be locked by the TEE, that is, the second-type peripheral may be set by the TEE to an occupied state. For ease of description, the peripheral that conflicts with the TUI and that is mentioned in the embodiment in FIG. 4A and FIG. 4B by default refers to a peripheral whose driver module is not in the TEE management module but is controllable or parable by the TEE management module.

Specifically, the REE management module needs to obtain a list of currently running REE applications, including a currently running foreground application and all background applications that use peripherals, such as a music player application and a telephone application. These applications may be applications provided by a terminal manufacturer or applications installed by the user. They are collectively referred to as third-party applications or conflicting applications herein. In this embodiment, the third-party application is equivalent to the conflicting application.

Step 404: The TEE management module determines, based on the identifier of the third-party application, whether a conflicting peripheral related to the third-party application can be accessed when the TUI is displayed. Specifically, it is determined whether the third-party application is an application in a whitelist in the TEE management module. When it is determined that none of third applications that request to access a peripheral is an application in the whitelist, the TEE management module sets an occupied mark for the conflicting peripheral and locks the peripheral. If a conflicting application that requests to access the peripheral is in the whitelist, the TEE only sets an occupied mark and does not lock the peripheral.

Further, the TEE management module generates a peripheral control policy file, and the peripheral control policy file includes at least one of the following: a whitelist and a peripheral that each whitelist application requests to access, or an application blacklist, a conflicting peripheral that the TEE sets to be locked, a conflicting peripheral that the TEE cannot control, and the like. According to the control policy file, the REE management module forbids running an application that is not in the whitelist, or forbids running an application that is in the blacklist, where applications in the blacklist are totally different from applications in the whitelist.

Step 405: The TEE management module sends a peripheral control policy file to the REE management module.

Step 406: The REE management module manages the conflicting peripheral according to the received peripheral control policy file, and manages a third-party application related to a controllable peripheral.

The REE management module performs peripheral management according to the received peripheral control policy file. If the whitelist includes a specific application and a specific peripheral, the REE management module allows the whitelist application to obtain data from the peripheral by using an REE driver. Finally, the REE disables all applications that are not in the whitelist, and disables a driver of a peripheral that the TEE sets to the locked state, or forbids a conflicting peripheral that the TEE does not set to the occupied state but that is not included in the whitelist.

Step 407: Display the TUI.

Step 408: The TEE management module determines to terminate display of the TUI.

Step 409: The TEE management module notifies the REE management module that the TUI is closed.

Step 410: After determining that the TUI is closed, the REE management module determines that the peripheral control policy file is invalid, and restores control over the conflicting peripheral and the related third-party application, that is, restarts the third-party application.

This embodiment of the present invention provides a method for processing peripheral data, so that not only information security of the terminal can be ensured, but also an access restriction on a terminal peripheral in a trusted execution environment TEE can be minimized, thereby less limiting and affecting a terminal function.

Figure 5:
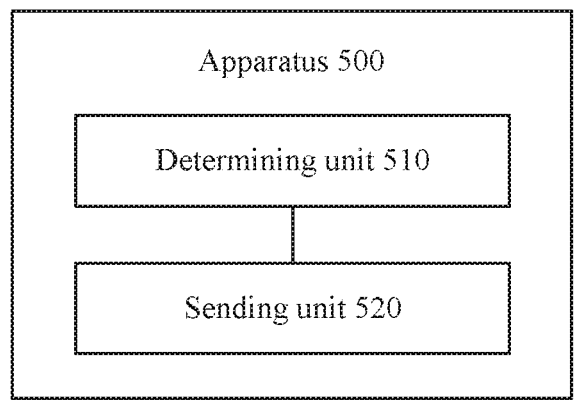
FIG. 5 is a schematic structural diagram of an apparatus according to an embodiment of the present invention.

FIG. 5 is a schematic structural diagram of an apparatus according to an embodiment of the present invention. As shown in FIG. 5, the apparatus may be a composition apparatus of a terminal, and the apparatus 500 includes:

a determining unit 510, where the determining unit 510 is configured to determine whether a first conflicting application related to a first conflicting peripheral is in a whitelist, where the determining unit 510 is further configured to: when it is determined that the first conflicting application is in the whitelist, independently take over the first conflicting peripheral, where the first conflicting application is an application that is running in a rich execution environment REE; and a sending unit 520, where the sending unit 520 is configured to: when the TUI is displayed, send data generated by the first conflicting peripheral to the first conflicting application.

Optionally, in an embodiment of the present invention, the determining unit 510 is specifically configured to: receive an application permission request message sent by an REE management module, where the application permission message carries an identifier of the first conflicting application and an identifier of the first conflicting peripheral: and determine, based on the identifier of the first conflicting application and the identifier of the first conflicting peripheral, whether the first conflicting application and the first conflicting peripheral are in the whitelist.

Optionally, in an embodiment of the present invention, the sending unit 520 is further configured to send an application permission verification complete message to the REE management module, where the application permission verification complete message is used to instruct the REE management module to release control permission for the first conflicting peripheral.

Optionally, in an embodiment of the present invention, the sending unit 520 is further configured to establish a data channel for communicating with the first conflicting application, where the data channel is used to transmit data of a target data type, and the target data type is a type, defined in the whitelist, of data that is transmitted between the first conflicting application and the first conflicting peripheral.

Optionally. in an embodiment of the present invention, the sending unit 520 is further configured to: when it is determined that a data type of the data generated by the first conflicting peripheral is the target data type, send the data generated by the first conflicting peripheral to the first conflicting application in the REE.

Optionally, in an embodiment of the present invention, the sending unit 520 is further configured to send a notification message to the REE management module, where the notification message is used to notify the REE management module that display of the TUI terminates, and the REE management module takes over the first conflicting peripheral again.

This embodiment of the present invention provides a method for processing peripheral data, so that not only information security of the terminal can be ensured, but also an access restriction on a terminal peripheral in a trusted execution environment TEE can be minimized, thereby less limiting and affecting a terminal function.

Figure 6:
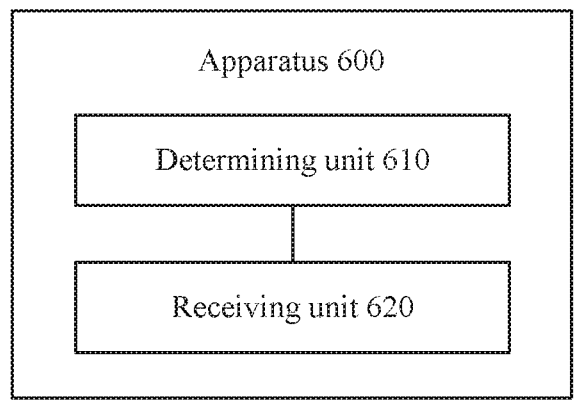
FIG. 6 is a schematic structural diagram of an apparatus according to another embodiment of the present invention.

FIG. 6 is a schematic structural diagram of an apparatus according to another embodiment of the present invention. As shown in FIG. 6, the apparatus may be a composition apparatus of a terminal, and the apparatus 600 includes:

a determining unit 610, where the determining unit 610 is configured to determine a first conflicting peripheral that conflicts with the TUI and determine a first conflicting application related to the first conflicting peripheral, where the determining unit 610 is further configured to: based on an application permission verification complete message sent by a trusted execution environment TEE management module, determine to allow the first conflicting application to receive data generated by the first conflicting peripheral, where the first conflicting application is an application that is running in a rich execution environment REE, and the permission verification complete message indicates that the first conflicting application is in a whitelist of the REE management module; and a receiving unit 620, where the receiving unit 620 is configured to: when the TUI is displayed, receive the data generated by the first conflicting peripheral and sent by the TEE.

Optionally, in an embodiment of the present invention, the determining unit 610 is specifically configured to send an application permission request message to the TEE management module, where the application permission message carries an identifier of the first conflicting application and an identifier of the first conflicting peripheral, and the identifier of the first conflicting application and the identifier of the first conflicting peripheral are used by the TEE management module to determine whether the first conflicting application and the first conflicting peripheral are in the whitelist.

Optionally, in an embodiment of the present invention, the determining unit 610 is specifically configured to release control permission for the first conflicting peripheral according to the application permission verification complete message.

Optionally, in an embodiment of the present invention, the receiving unit 620 is specifically configured to establish a data channel for communicating with the TEE management module, where the data channel is used to transmit data of a target data type, and the target data type is a type, defined in the whitelist, of data that is transmitted between the first conflicting application and the first conflicting peripheral.

Optionally, in an embodiment of the present invention, the receiving unit 620 is specifically configured to receive, through the data channel, data of the target data type that is generated by the first conflicting peripheral.

Optionally, in an embodiment of the present invention, the receiving unit 620 is specifically configured to receive a notification message sent by the TEE management module, where the notification message is used to notify the REE management module that display of the TUI terminates, and the REE management module takes over the first conflicting peripheral again.

This embodiment of the present invention provides a method for processing peripheral data, so that not only information security of the terminal can be ensured, but also an access restriction on a terminal peripheral in a trusted execution environment TEE can be minimized, thereby less limiting and affecting a terminal function.

Figure 7:
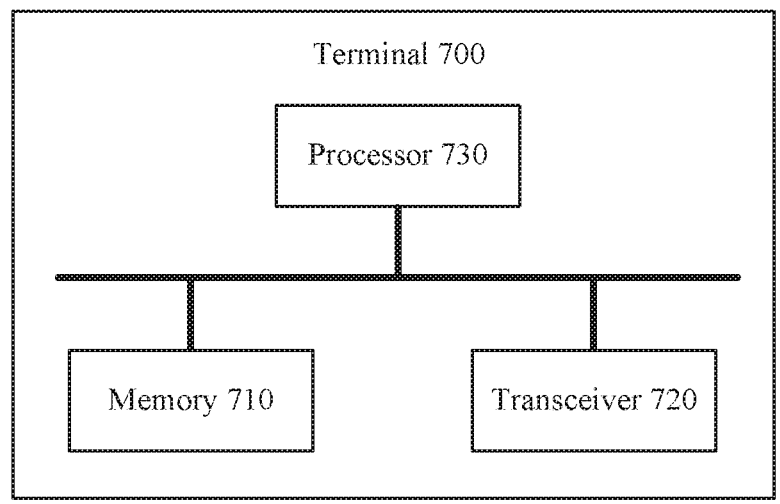
FIG. 7 is a schematic block diagram of a terminal according to an embodiment of the present invention.

FIG. 7 is a schematic block diagram of a terminal according to an embodiment of the present invention. As shown in FIG. 7, the terminal 700 includes: a transceiver 720, a memory 710, configured to store an instruction, and a processor 730, connected to both the memory 710 and the transceiver 720 and configured to execute the instruction stored in the memory 710, so as to control the transceiver 720 to receive a signal and/or send a signal, and when the processor 730 executes the instruction stored in the memory, the processor performs the method in the embodiment of FIG. 1 or FIG. 3A and FIG. 3B and the method in the embodiment of FIG. 2 or FIG. 4A and FIG. 4B.

Figure 8:
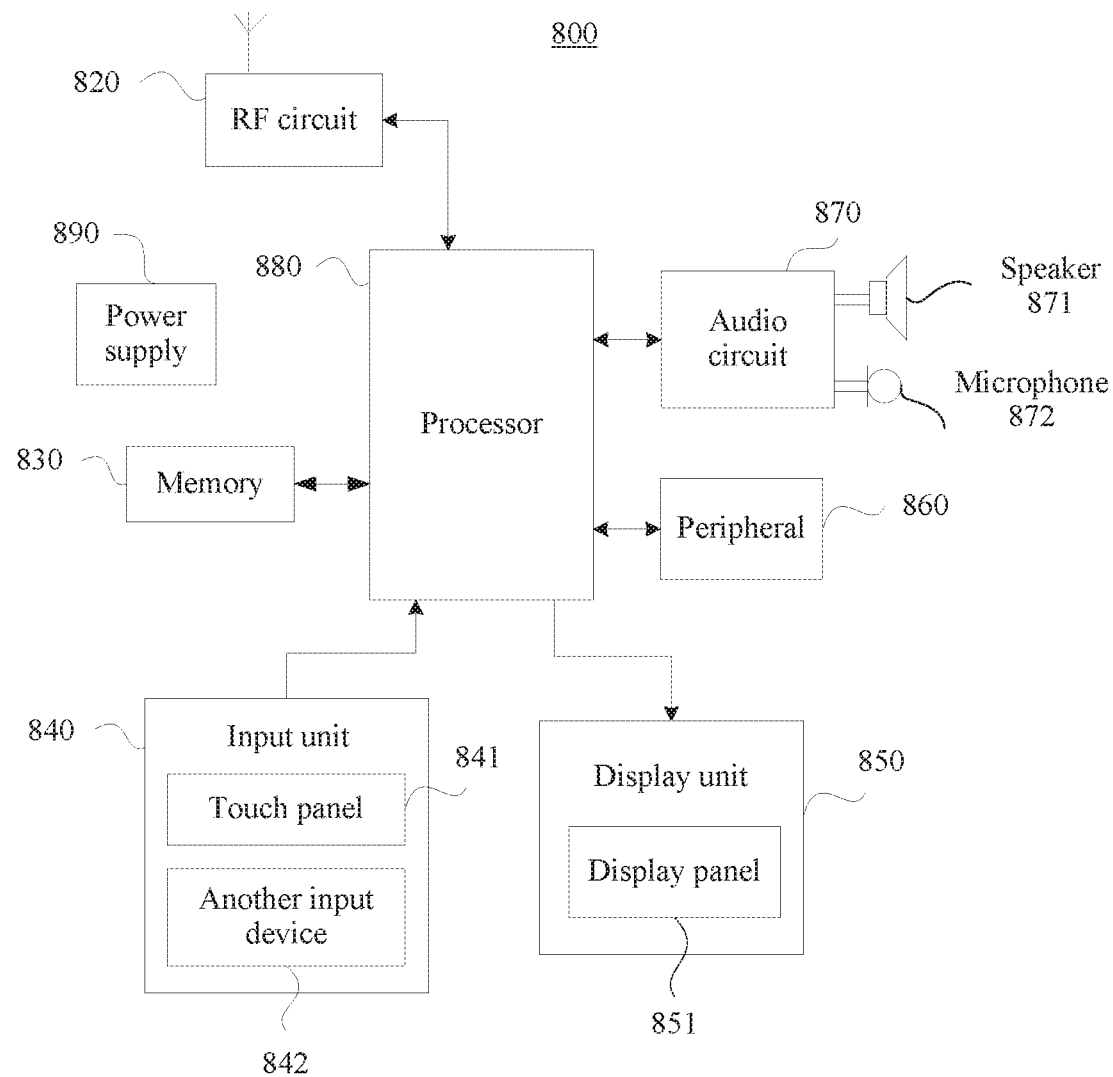
FIG. 8 is a schematic block diagram of a terminal according to an embodiment of the present invention.

FIG. 8 is a schematic block diagram of a terminal according to an embodiment of the present invention. FIG. 8 is a schematic structural diagram of a mobile terminal according to an embodiment of the present invention. The mobile terminal provided in this embodiment of the present invention may be configured to implement the methods implemented in the embodiments of the present invention shown in FIG. 1 to FIG. 4A and FIG. 4B. For ease of description, only a part related to this embodiment of the present invention is shown. For specific technical details that are not disclosed, refer to the embodiments of the present invention shown in FIG. 1 to FIG. 4A and FIG. 4B.

The mobile terminal may be a terminal, such as a mobile phone, a tablet computer, a notebook computer, a UMPC (Ultra-mobile Personal Computer, ultra-mobile personal computer), a netbook, and a PDA (Personal Digital Assistant, personal digital assistant). In this embodiment of the present invention, an example in which the mobile terminal is a mobile phone is used for description. FIG. 8 is a block diagram of a partial structure of a terminal 800 related to the embodiments of the present invention.

As show n in FIG. 8. the terminal 800 includes components such as an RF (radio frequency, radio frequency) circuit 820, a memory 880, an input unit 840, a display unit 850, a peripheral 860, an audio circuit 870, a processor 880, and a power supply 890. A person skilled in the art may understand that a structure of the terminal shown in FIG. 8 does not constitute a limitation on the terminal, may include more or fewer components than those shown in FIG. 8, combine some components, or have different component deployment.

The following describes each component of the terminal 800 in detail with reference to FIG. 8.

The RF circuit 820 may be configured to: receive and send a signal in an information receiving or sending process or in a call process: particularly, after receiving downlink information from a base station, send the downlink information to the processor 880 for processing: and send uplink data to the base station. Usually, the RF circuit includes but is not limited to an antenna, at least one amplifier, a transceiver, a coupler, an LNA (low noise amplifier, low noise amplifier), a duplexer, and the like. In addition, the RF circuit 820 may further communicate with a network and another device through wireless communication. The wireless communication may use any communications standard or protocol, including but not limited to GSM (Global System for Mobile Communications, Global System for Mobile Communications), GPRS (general packet radio service, general packet radio service), CDMA (code division multiple access, Code Division Multiple Access), WCDMA (wideband code division multiple access, Wideband Code Division Multiple Access), LTE (long term evolution, Long Term Evolution), an email, an SMS (short message service, short message service), and the like.

The memory 830 may be configured to store a software program and a module, and the processor 880 performs various functional applications of the terminal 800 and data processing by running the software program and the module that are stored in the memory 830. The memory 830 may mainly include a program storage area and a data storage area. The program storage area may store an operating system. an application required by at least one function (such as an audio play function and an image play function), and the like, and the data storage area may store data (such as audio data, image data, or an address book) created according to use of the terminal 800, and the like. In addition, the memory 830 may include a high-speed random access memory, and may further include a non-volatile memory, for example, at least one magnetic disk storage device, a flash storage device, or another volatile solid-state storage device.

The input unit 840 may be configured to: receive input digital or character information, and generate key signal input related to user setting and function control of the terminal 800. Specifically, the input unit 840 may include a touchscreen 841 and another input device 842. The touchscreen 841 is also referred to as a touch panel and may collect a touch operation performed by the user on or near the touchscreen (such as an operation performed by the user on the touchscreen 841 or near the touchscreen 841 by using any proper object or accessory, such as a finger or a stylus), and drive a corresponding connection apparatus according to a preset program. Optionally, the touchscreen 841 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into touch point coordinates, and then sends the touch point coordinates to the processor 880. The touch controller can receive and perform a command sent by the processor 880. In addition, the touchscreen 841 may be implemented by using a plurality of types such as a resistive type, a capacitive type, an infrared ray, and a surface acoustic wave. In addition to the touchscreen 841, the input unit 840 may include the another input device 842. Specifically, the another input device 842 may include but is not limited to one or more of the following: a physical keyboard, a function key (such as a volume control key or an on/off key), a trackball, a mouse, a joystick, and the like.

The display unit 850 may be configured to display information entered by the user or information provided for the user, and various menus of the terminal 800. The display unit 850 may include a display panel 851. Optionally, the display panel 841 may be configured by using an LCD (Liquid Crystal Display, liquid crystal display), an OLED (Organic Light-Emitting Diode, organic light-emitting diode), or the like. Further, the touchscreen 841 may cover the display panel 851. After detecting a touch operation on or near the touchscreen 841, the touchscreen 141 transmits the touch operation to the processor 880 to determine a type of a touch event, and then the processor 880 provides corresponding visual output on the display panel 851 based on the type of the touch event. In FIG. 8, the touchscreen 841 and the display panel 851 are used as two independent components to implement input and input functions of the terminal 800. However, in some embodiments, the touchscreen 841 and the display panel 851 may be integrated to implement the input and output functions of the terminal 800.

In terms of the peripheral 860, an interface device such as Bluetooth, Wireless Fidelity (English: Wireless Fidelity, Wi-Fi for short), near field communication (English: Near Field Communication, NFC for short), a universal serial bus (English: Universal Serial Bus, USB for short), a microphone, or a 3.5-mm audio jack is considered as a peripheral.

The terminal 800 may further include another sensor, such as a light sensor. Specifically, the light sensor may include an ambient light sensor and an optical proximity sensor. The ambient light sensor may adjust luminance of the display panel 841 based on brightness of ambient light, and the optical proximity sensor may detect whether an object approaches or touches the terminal, and may turn off the display panel 841 and/or backlight when the terminal 800 approaches an ear. A gyroscope, a barometer, a hygrometer, a thermometer, an infrared sensor, and other sensors may be further configured for the terminal 800. Details are not described herein.

The audio circuit 870. a speaker 871, and a microphone 872 may provide an audio interface between the user and the terminal 800. The audio circuit 870 may transmit, to the speaker 871, an electrical signal converted from received audio data; and the speaker 871 converts the electrical signal into a sound signal and output the sound signal. In addition, the microphone 872 converts a collected sound signal into an electrical signal, the audio circuit 870 receives and converts the electrical signal into audio data and then outputs the audio data to the RF circuit 820: and the audio data is sent to, for example, another terminal, or the audio circuit 870 outputs the audio data to the memory 830 for further processing.

The processor 880 is a control center of the terminal 800, and connects to various parts of the entire terminal by using various interfaces and lines. The processor 880 performs various functions of the terminal 800 and data processing by running or executing the software program and/or the module stored in the memory 830 and by invoking data stored in the memory 830, to perform overall monitoring on the terminal. In this embodiment of the present invention, the processor includes a TEE management module and an REE management module, and may be configured to implement the methods implemented in the embodiments of the present invention shown in FIG. 1 to FIG. 4A and FIG. 4B. Optionally, the processor 880 may include one or more processing units. Preferably, an application processor and a modem processor may be integrated into the processor 880, where the application processor mainly processes an operating system. a user interface, an application program, and the like; and the modem processor mainly processes the wireless communication. It may be understood that, alternatively, the modem processor may not be integrated into the processor 880.

The terminal 800 further includes the power supply 890 (such as a battery) that supplies power to components. Preferably, the power supply may be logically connected to the processor 880 by using a power management system, so that functions such as charging and discharging management, and power consumption management are implemented by using the power management system.

Although not shown in the figure. the terminal 800 may further include a Wi-Fi (wireless fidelity, Wireless Fidelity) module, a Bluetooth module, and the like. Details are not described herein.

In this embodiment of the present invention, the memory 830 is further configured to store a whitelist.

In this embodiment of the present invention, the processor 880 is further configured to perform each step performed by each apparatus in FIG. 1 to FIG. 4A and FIG. 4B. To avoid repetition, details are not described herein again.

This embodiment of the present invention provides a method for processing peripheral data, so that not only information security of the terminal can be ensured, but also an access restriction on a terminal peripheral in a trusted execution environment TEE can be minimized, thereby less limiting and affecting a terminal function.

It should be understood that in the embodiment of the present invention, the processor in the foregoing apparatus may be a central processing unit (Central Processing Unit, CPU), or the processor may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor or the like.

In an implementation process, the steps in the foregoing methods can be implemented by using a hardware integrated logical circuit in the processor, or by using instructions in a form of software. The steps of the method disclosed with reference to the embodiments of the present invention may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor reads an instruction in the memory and completes the steps in the foregoing methods in combination with hardware of the processor. To avoid repetition, details are not described herein again.

A person of ordinary skill in the art may be aware that, with reference to the examples described in the embodiments disclosed in this specification, method steps and units may be implemented by electronic hardware, computer software, or a combination thereof. To clearly describe interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is only an example. For example, the unit division is only logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments of the present invention.

The term "and/or" in this specification describes only an association relationship for describing associated objects and represents that three relationships may exist. For example. A and/or B may represent the following three cases: Only A exists, both A and B exist, and only B exists. In addition, the character "/" in this specification usually indicates an "or" relationship between the associated objects.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (that may be a personal computer, a server, or a network device) to perform all or some of the steps of the methods described in the embodiments of the present invention. The foregoing storage medium includes various media that can store program code, such as a USB flash drive, a removable hard disk a read-only memory (Read-Only Memory. "ROM" for short), a random access memory (Random Access Memory, "RAM" for short), a magnetic disk, or an optical disc.

The foregoing descriptions are merely specific implementations of the embodiments of the present invention, but are not intended to limit the protection scope of the present invention. Various equivalent modifications or replacements readily figured out by a person skilled in the art within the technical scope disclosed in the present invention shall fall within the protection scope of the present invention. Therefore, the protection scope of the embodiments of the present invention shall be subject to the protection scope of the claims.

What is claimed is:

1. A terminal, comprising:
    at least one processor; and
    a memory coupled to the at least one processor and configured to store programming instructions that, when executed by the at least one processor, cause the terminal to:
        determine whether a first conflicting application related to a first conflicting peripheral is in a whitelist;
        send an application permission verification complete message to a rich execution environment (REE) management circuit, wherein the application permission verification complete message instructs the REE management circuit to release control permission for the first conflicting peripheral;
        independently take over the first conflicting peripheral in response to the first conflicting application being in the whitelist, wherein the first conflicting application runs in an REE;
        establish a data channel for communicating with the first conflicting application, wherein the data channel transmits data of a target data type, and wherein the target data type is a type of data transmitted between the first conflicting application and the first conflicting peripheral and defined in the whitelist; and
        send data generated by the first conflicting peripheral to the first conflicting application in response to a trusted user interface (TUI) being displayed.

2. The terminal of claim 1, wherein the programming instructions that, when executed by the at least one processor, cause the terminal to determine whether the first conflicting application related to the first conflicting peripheral is in the whitelist comprises the terminal being caused to:
    receive an application permission request message from an REE management circuit, wherein the application permission request message carries an identifier of the first conflicting application and an identifier of the first conflicting peripheral; and
    determine, based on the identifier of the first conflicting application and the identifier of the first conflicting peripheral, whether the first conflicting application and the first conflicting peripheral are in the whitelist.

3. The terminal of claim 1, wherein a data type of the data generated by the first conflicting peripheral is the target data type, and wherein the programming instructions that, when executed by the at least one processor, cause the terminal to send the data generated by the first conflicting peripheral to the first conflicting application comprises the terminal being configured to send the data generated by the first conflicting peripheral to the first conflicting application.

4. The terminal of claim 3, wherein when executed by the at least one processor, the programming instructions further cause the terminal to send a notification message to the REE management circuit notifying that a display of the TUI terminates and that the REE management circuit is to take over the first conflicting peripheral again.

5. The terminal of claim 1, wherein the whitelist comprises an application list.

6. The terminal of claim 1, wherein the whitelist comprises an application identifier and a peripheral identifier.

7. The terminal of claim 1, wherein the whitelist comprises an application identifier and a data type.

8. The terminal of claim 1, wherein the REE comprises an ANDROID operating system.

9. The terminal of claim 1, wherein the REE comprises an iOS operating system.

10. The terminal of claim 1, wherein the TUI is controlled by a trusted application that invokes the TUI.

11. A terminal, comprising:
    at least one processor; and
    a memory coupled to the at least one processor and configured to store programming instructions that, when executed by the at least one processor, cause the terminal to:
        determine a first conflicting peripheral that conflicts with a trusted user interface (TUI);
        determine a first conflicting application related to the first conflicting peripheral;
        receive a permission verification complete message from a trusted execution environment (TEE) management circuit, wherein the permission verification complete message indicates that the first conflicting application is in a whitelist of a TEE;
        release control permission for the first conflicting peripheral according to the permission verification complete message;
        establish a data channel for communicating with the TEE management circuit, wherein the data channel transmits data of a target data type, and wherein the target data type is a type of data transmitted between the first conflicting application and the first conflicting peripheral and defined in the whitelist;
        allow, based on the permission verification complete message, the first conflicting application to receive data generated by the first conflicting peripheral, wherein the first conflicting application runs in a rich execution environment (REE); and allow the first conflicting application to receive the data generated by the first conflicting peripheral from the TEE management circuit in response to the TUI being displayed.

12. The terminal of claim 11, wherein when executed by the at least one processor, the programming instructions further cause the terminal to send an application permission request message to the TEE management circuit, and wherein the application permission request message carries an identifier of the first conflicting application and an identifier of the first conflicting peripheral to enable the TEE management circuit to determine whether the first conflicting application and the first conflicting peripheral are in the whitelist.

13. The terminal of claim 11, wherein the programming instructions that, when executed by the at least one processor, cause the terminal to allow the first conflicting application to receive the data generated by the first conflicting peripheral from the TEE management circuit comprises the terminal being configured to allow the first conflicting application to receive, using the data channel, data of the target data type generated by the first peripheral conflicting peripheral.

14. The terminal of claim 13, wherein when executed by the at least one processor, the programming instructions further cause the terminal to receive a notification message from the TEE management circuit, and wherein the notification message notifies that a display of the TUI terminates and that an REE management circuit is to take over the first conflicting peripheral again.

15. A data processing method, comprising:
determining whether a first conflicting application related to a first conflicting peripheral is in a whitelist;
sending an application permission verification complete message to a rich execution environment (REE) management circuit, wherein the application permission verification complete message instructs the REE management circuit to release control permission for the first conflicting peripheral;
independently taking over the first conflicting peripheral in response to the first conflicting application being in the whitelist, wherein the first conflicting application runs in an REE;
establishing a data channel for communicating with the first conflicting application, wherein the data channel transmits data of a target data type, and wherein the target data type is a type of data transmitted between the first conflicting application and the first conflicting peripheral and defined in the whitelist; and
sending data generated by the first conflicting peripheral to the first conflicting application in response to a trusted user interface (TUI) being displayed.

16. The data processing method of claim 15, wherein determining whether the first conflicting application is in the whitelist comprises:
receiving an application permission request message from the REE management circuit, wherein the application permission request message carries an identifier of the first conflicting application and an identifier of the first conflicting peripheral; and
determining, based on the identifier of the first conflicting application and the identifier of the first conflicting peripheral, whether the first conflicting application and the first conflicting peripheral are in the whitelist.

17. The data processing method of claim 15, wherein a data type of the data generated by the first conflicting peripheral is the target data type, and wherein sending the data generated by the first conflicting peripheral to the first conflicting application comprises sending the data generated by the first conflicting peripheral to the first conflicting application.

18. The data processing method of claim 17, further comprising sending a notification message to the REE management circuit, wherein the notification message notifies the REE management circuit that a display of the TUI terminates and that the REE management circuit is to take over the first conflicting peripheral again.

* * * * *